CROSS REFERENCE SEARCH RO

March 29, 1966 C. B. BRAHM 3,243,713

INTEGRATED MAGNETO-HYDRODYNAMIC GENERATOR-RADIO FREQUENCY GENERATOR

Filed Dec. 31, 1962 5 Sheets-Sheet 1

INVENTOR
CHARLES B. BRAHM
BY Vernon F. Hauschild
ATTORNEY

INVENTOR
CHARLES B. BRAHM
BY Vernon F. Hauschild
ATTORNEY

March 29, 1966 C. B. BRAHM 3,243,713

INTEGRATED MAGNETO-HYDRODYNAMIC GENERATOR-RADIO FREQUENCY GENERATOR

Filed Dec. 31, 1962 5 Sheets-Sheet 3

INVENTOR
CHARLES B. BRAHM

BY Vernon F. Hauschild
ATTORNEY

INVENTOR
CHARLES B. BRAHM
BY Vernon F. Hauschild
ATTORNEY

March 29, 1966 C. B. BRAHM 3,243,713

INTEGRATED MAGNETO-HYDRODYNAMIC GENERATOR-RADIO FREQUENCY GENERATOR

Filed Dec. 31, 1962 5 Sheets-Sheet 5

INVENTOR
CHARLES B. BRAHM
BY Vernon F. Hauschild
ATTORNEY

United States Patent Office 3,243,713

Patented Mar. 29, 1966

3,243,713

INTEGRATED MAGNETO-HYDRODYNAMIC GENERATOR-RADIO FREQUENCY GENERATOR

Charles B. Brahm, Ellington, Conn., assignor to United Aircraft Corporation, East Hartford, Conn., a corporation of Delaware Filed Dec. 31, 1962, Ser. No. 248,358
5 Claims. (Cl. 328—227)

This invention relates to the generation of radio frequency energy from a nonelectrical energy source and more particularly the generation of super high microwave energy in either the S, X or high frequency range between three thousand to ten thousand megacycles by using a magnetohydrodynamic (MHD) generator in combination with one or more cross-field devices.

It is an object of this invention to produce radio frequency energy utilizing the combination of a magnetohydrodynamic generator and a cross-field device such as one or more magnetrons, amplitrons, stabilatrons or carcinatrons.

It is a further object of this invention to combine a microwave converter and a magnetohydrodynamic generator to produce microwave energy and power in the radio frequency band from D.C. energy such that the MHD generator and the microwave converter use a common magnetic field, further such that the D.C. voltage generated by the MHD generator provides the necessary voltage to the anode and cathode of the microwave converter, and further such that the heat from the electrically charged fluid or plasma from the MHD generator provides the heat necessary to cause the cathode of the microwave converter to emit electrons, or such that the negative electrode of the MHD generator provides the heat required to the microwave converter cathode to cause electron emission therefrom, and wherein the microwave is a cross-field device, and wherein the cathode electron emission serves to cool the MHD generator.

It is a further object of this invention to provide an MHD generator connected to a microwave converter of the cross-field type such that a plurality of cross-field devices are energized by a single or plural MHD generator with the output microwave signal of each cross-field device being fed to a single antenna from which it is directed, preferably through proper lensing, to its eventual destination.

It is still a further object of this invention to provide radio wave power from a heated plasma or electrically charged jet acting directly upon a microwave field.

Other objects and advantages will be apparent from the specification and claims and from the accompanying drawings which illustrate an embodiment of the invention.

Figure 11:
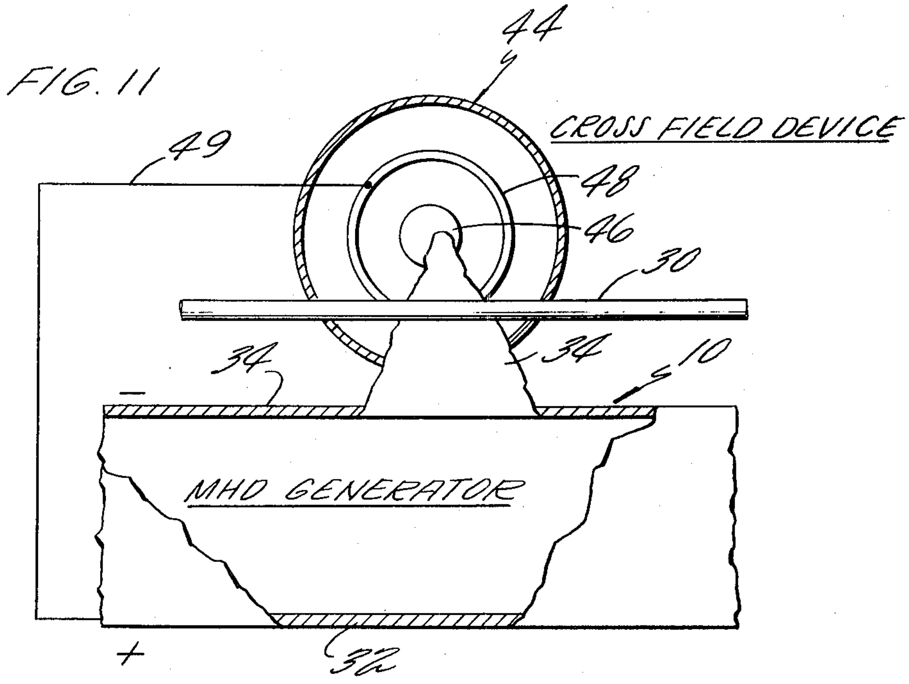

FIG. 11 illustrates a cross-field device and a magnetohydrodynamic (MHD) generator sharing a common magnetic field and positioned so that the negative electrode of the MHD generator is electrically connected to the cathode of the cross-field device and so that the positive electrode of the MHD generator is electrically connected to the anode of the cross-field device and, further, so that the cathode of the cross-field device is heated by the MHD generator.

As used herein, the term cross-field device means a device which uses crossed or perpendicular magnetic and electric fields to cause electrons or other media to act upon periodic structures to generate microwave energy therefrom.

Figure 1:
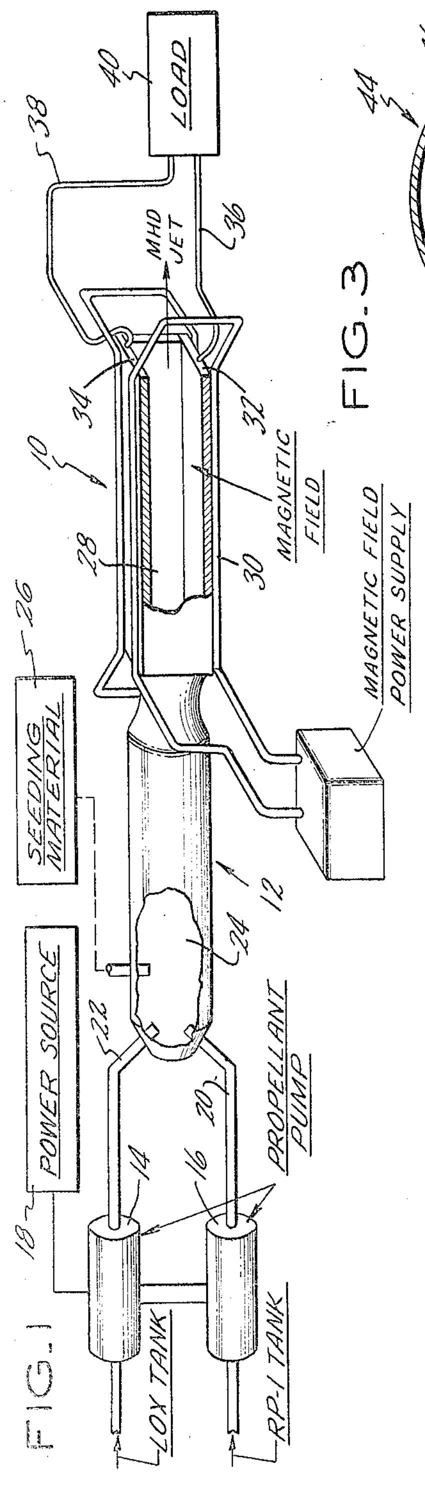
FIG. 1 is a schematic representation, partially broken away for purposes of illustration, showing an MHD generator.

Referring to FIG. 1 we seen an illustration of magnetohydrodynamic generator 10. High temperature plasma or electrically charged fluid may be generated in plasma generator 12, which may be a conventional liquid rocket combustion chamber. Plasma is a gas of positive and negative particles of equal proportions so that the charge density is zero. The conventional liquid propellants are pumped from propellant tanks (not shown) by propellant pumps 14 and 16, which are driven by a conventional power source 18, to provide the liquid fuel and oxidizer through lines 20 and 22 into combustion chamber 24 of rocket motor 12. A seeding material such as a potassium compound, one to three percent preferably, is injected into combustion chamber 24 from seeding source 26. The seeding material may be in liquid or solid form and may either be gravity fed into the combustion chamber 24 or pumped thereinto in conventional fashion. The plasma or electrically charged fluid is passed then through MHD generator duct 28. Dust 28 has a magnetic field imposed thereacross by magnets 30 such that the plasma or electrically charged fluid, in passing through duct 28, intercepts the magnetic field and causes a D.C. electric voltage to be generated between positive electrode 32 and negative electrode 34, which are located in the opposite walls of duct 28. The D.C. voltage is taken from electrodes 32 and 34 and passed through lines 36 and 38 to any load 40, which in this application is going to be microwave converter apparatus.

While a simple MHD generator is illustrated in FIG. 1, it will be clear to those skilled in the art that a MHD generator of the type shown on page 78 of the November 2, 1961, issue of Time magazine could as well be substituted therefor, as could the two-phase D.C. or A.C. MHD generator fully disclosed and claimed in the United States patent application Serial No. 248,532 filed on December 31, 1962, in the name of John W. Larson and entitled "Two-Phase Fluid Power Generator With No Moving Parts."

Figure 2:
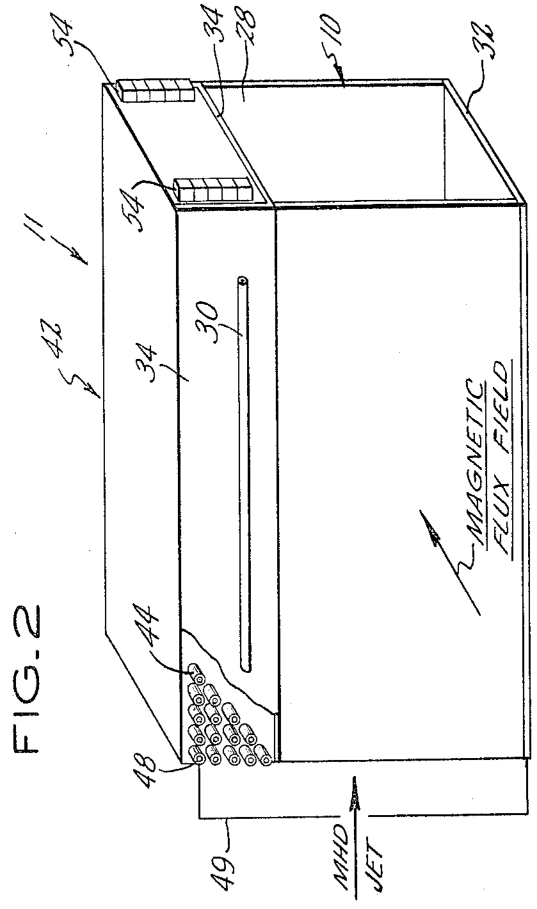
FIG. 2 is a showing of an MHD generator, with portions removed for purpose of illustration, integrated with a plurality of microwave converters of the cross-field type to produce microwave energy.

Referring to FIG. 2, we see MHD generator-microwave converter unit 11 which comprises MHD generator 10 in combination with the microwave converter mechanism 42. For purposes of description, only duct 28, negative electrode 34 and positive electrode 32 and magnets 30 of the MHD generator 10 are shown and it should be borne in mind that heated plasma or electrically charged fluid is being passed through duct 28 to intercept the magnetic field as illustrated in FIG. 1 and this magnetic field is of such size and proportion that the microwave converter mechanism 42 is also positioned therein. For purposes of illustration the microwave converter mechanism 42 is illustrated to be a plurality of amplitrons 44 but it should be borne in mind that many other types of cross-field devices could as well have been used. The negative electrode 34 of the MHD generator 10 is formed in U-shaped cross section as illustrated so that the cathode 46 of each amplitron may be attached thereto. A single amplitron 44 is shown in greater particularity in FIG. 3 and the cathode 46 thereof connects to the negative electrode 34 of the MHD generator. Each amplitron 44 also includes an anode or periodic structure 48. The cathode 46 and the anode 48 of amplitron 44 are embedded in vacuum within vacuum wall 50. While cathode 46 physically contacts negative electrode 34 of the MHD generator, anode 48 is preferably electrically insulated therefrom. It will be noted that amplitron 44 is positioned in close proximity to the MHD generator 10 such that the magnetic field established by magnets 30 extend across MHD generator duct 28 as well as across the cross-field mechanism 42 and, the high temperature plasma or electrically charged fluid passing through duct 28 is in sufficiently close proximity to cross-field device mechanism 42 that it will serve to heat the cathode 46 thereof and hence cause electron emissions from the surface thereof. Electrode 34 of the MHD generator 10 also serves in this cathode heating function.

Cathode 46 of mechanism 42 is directly and hence electrically connected to the MHD negative electrode 34 and the anode or periodic structure 48 is electrically connected to positive electrode 32, for example, through connector 49. Accordingly, the D.C. voltage between the MHD electrodes is supplied across the cross-field device cathode and anode to establish an electric field crossed with the magnetic field established by magnets 30. The electrons emitted from the heated surface of electrode 46, in passing through said crossed fields, are caused to form a selected electron pattern having a selected velocity and an electromagnetic field associated therewith. The electromagnetic field established by the electron pattern excites an alternating electromagnetic field around the periodic structure 48 in passing thereby to establish microwave energy.

While magnetrons and other cross-field devices to be described hereinafter do not need external electric or microwave excitation to cause them to generate microwave energy, the amplitron 44 illustrated in FIG. 2 does.

Figure 3:
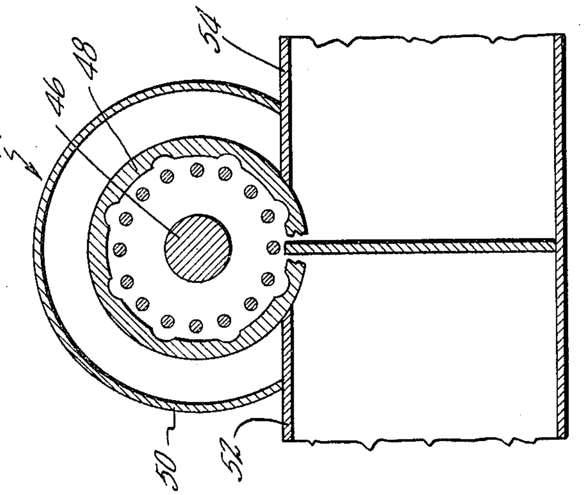
FIG. 3 is an enlarged cross-section showing of a single cross-field device to illustrate the input and output signal in environment.

This external excitation is created by any external source such as a small magnetron, not shown, and is fed through input guide waves 52 into the amplitron 44, as best shown in FIG. 3, and is then taken therefrom as the microwave output signal of the amplitron through output guide waves 54. The wave guides 52 and 54 are of conventional design and may be of the type fully described in chapter 5 of a publication entitled "Electronic and Radio Engineering" by Frederick E. Terman, 4th edition, published by McGraw-Hill and illustrated in FIG. 1–5 thereof.

By referring to FIG. 2 it will be seen that the MHD generator 10 has a microwave converter mechanism 42 positioned in a common magnetic field and that the D.C. voltage generated by the MHD generator 10 across electrodes 32 and 34 thereof imparts a similar voltage across the cathode and anode, 46 and 48 of the cross-field device. In addition, the heat generated by either the plasma flowing through the MHD generator or the negative electrode 34 thereof provides the heat to the cathode 46 of the cross-field device to cause electron emission thereof. It will be recognized, accordingly, that the parameter outputs of the MHD generator serve as the parameter inputs of the cross-field device and that both devices share a common magnetic field.

Figure 8:
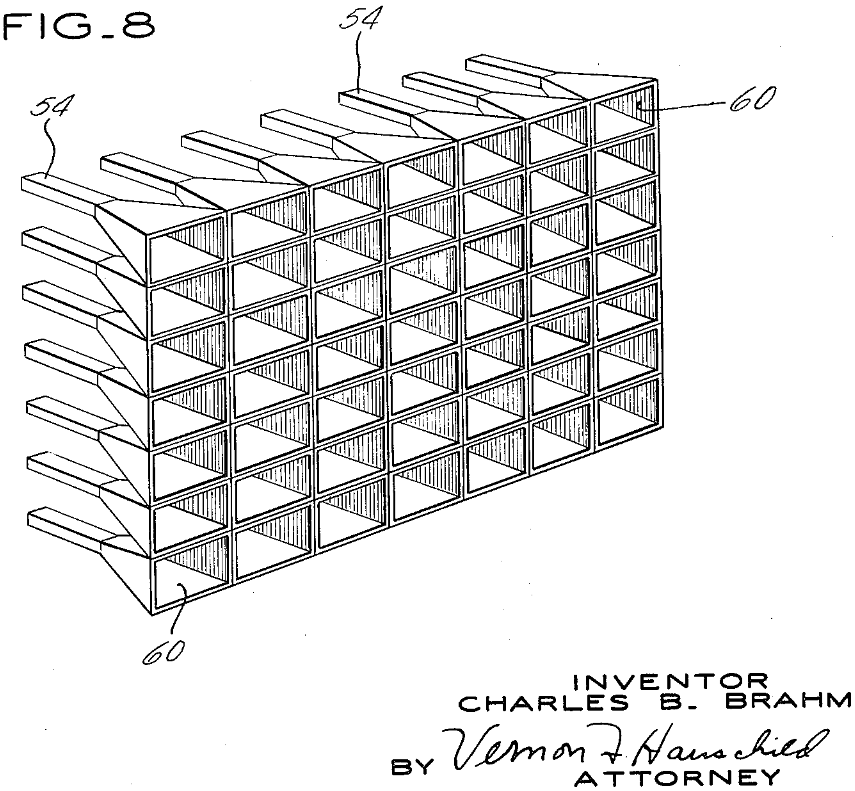
FIG. 8 is a showing of a microwave antenna illustrating the antenna configuration and the manner in which the output waveguides from the several cross-field devices feed into the antenna.
Figure 9:
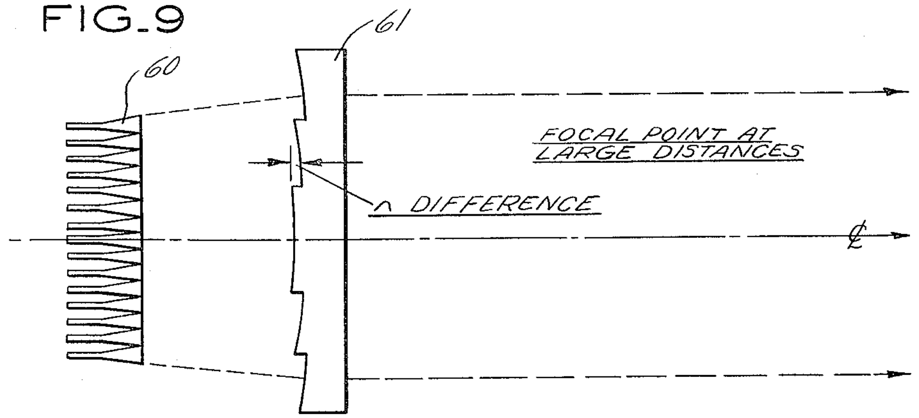
FIG. 9 illustrates an E-plane lens used in conjunction with the microwave antenna shown in FIG. 8 to produce a focal point for the combined microwave energy at a distant point.

While in FIG. 2 but two banks of microwave output wave guides 54 are illustrated, it should be borne in mind that preferably several such banks are positioned between the two illustrated banks such that a plurality of output guidewaves 54 are simultaneously fed to antenna 60, shown in FIG. 8, and then, preferably, through an E-plane line 61 as shown in FIG. 9 to produce a focal point of microwave energy at some distant point. Line 61 could be an artifical dialectric lens or an E-plane metal-plate lens as described in the 1950 McGraw-Hill publication by J. D. Kraus entitled "Antennas," or could be an H-plane metal-plate lens or a honeycomb lens.

Figure 4:
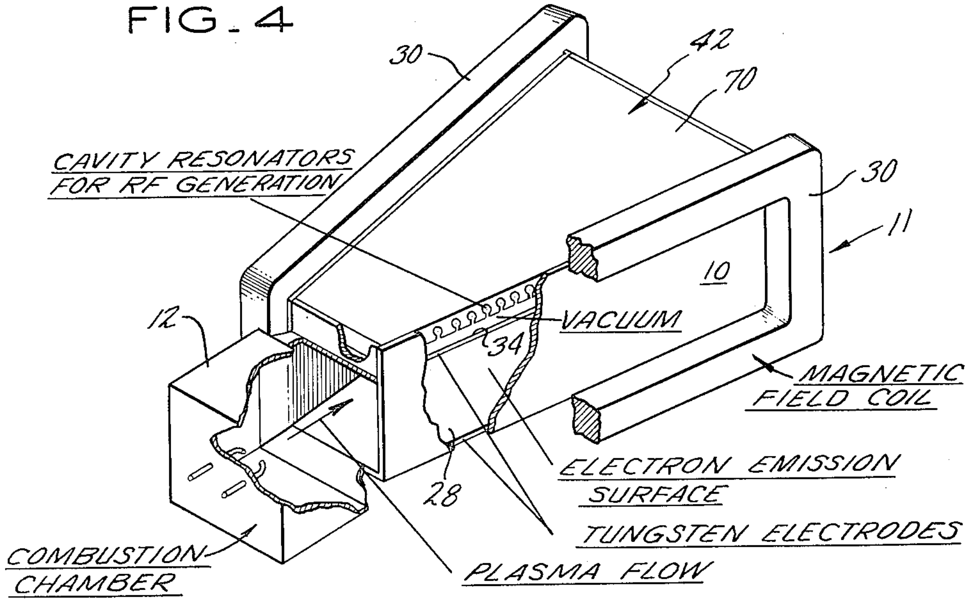
FIG. 4 is a schematic representation, partially broken away, illustrating a MHD generator in combination with a flat or "unrolled" microwave converter of the cross-field type.

Referring to FIG. 4, we see another embodiment of my combined MHD generator and radio frequency converter apparatus including the magnetic coils 30 and the duct 28 as well as the combustion or plasma generator 12 of the MHD generator 10, together with the microwave conversion apparatus 42, which is in the form of an "unrolled" or linear magnetron 70 extending along the negative electrode 34 of the MHD generator. The mechanism shown in FIG. 4 operates in the same fashion as described for the mechanism shown in FIG. 2. A magnetron is of conventional design as described fully in the aforementioned Terman reference in chapter 19 thereof and as illustrated on page 689 thereof. The linear magnetron and its mode of operation is described fully in an article entitled "The Magnetron-Type Travelling-Wave Tube" published in the May 1950 issue, volume 38, No. 5 of the Proceedings of the I.R.E. The advantage of the FIG. 4 construction is a much larger cathode emission surface than with a tube-type circular magnetron direct heating of the magnetron cathode with plasma and direct cooling of the MHD generator by electron boil-off from the back surface, a large member of cavity resonators may be used and conductors are eliminated.

Figure 5:
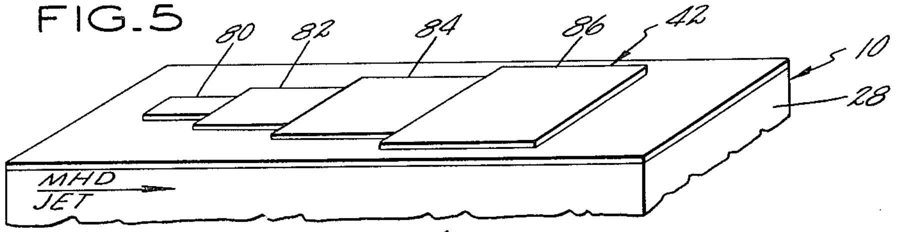
FIG. 5 is a showing of a MHD generator in combination with a microwave converter mechanism in which the microwave converter units are cascaded in linear fashion.

Referring to FIG. 5, we see another embodiment of my combined MHD generator 10 and cross-field mechanism 42. The FIG. 5 embodiment is similar to the FIGS. 2 and 4 embodiment by way of operation of the MHD generator 10, but it should be noted that the cross-field mechanism 42 is in different form.

In the FIG. 5 configuration, the cross-field devices are connected in cascaded fashion such that the first linear cross-field device 80 produces a microwave output which constitutes the input of six crosswave devices 82, whose output constitutes the input of 36 crosswave devices 84, whose output constitutes the input of 216 crosswave devices 86, etc., until eventually, the desired number of crosswave devices are caused to produce the desired amount of microwave energy.

Figure 10:
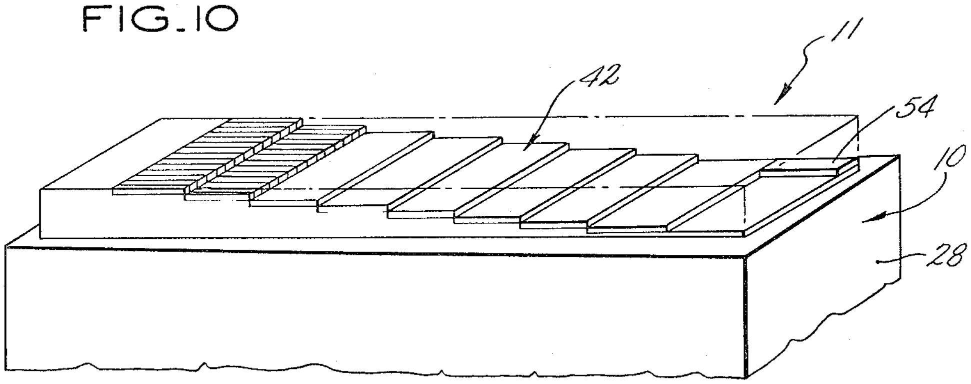
FIG. 10 shows an arrangement in which the cross-field devices are placed in tiers.

Further, as shown in FIG. 10, the cross-field devices may be positioned in tiers so that the individual devices may send their individual outputs directly to an antenna.

Figure 6:
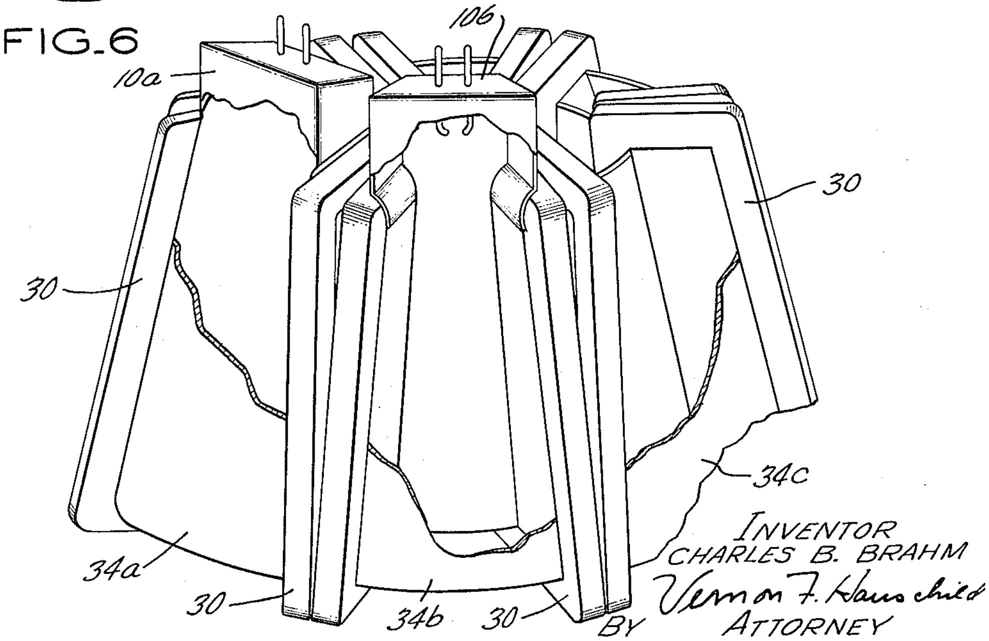
FIG. 6 is a showing of toroidal placement of the MHD generators with microwave converters to utilize the entire magnetic circuit. The toroidal placement of the MHD generators produces a toroidal magnetic field and as illustrated in FIG. 6, the plasma flow is axial and the electric field radial.
Figure 7:
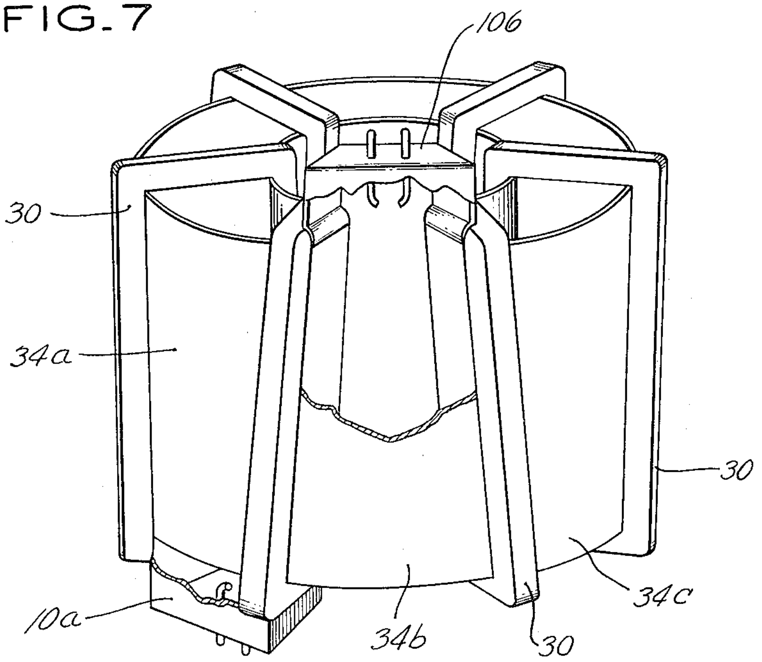
FIG. 7 is similar to FIG. 6 but half of the MHD generators are reversed in flow to make better use of the magnetized volume and to shorten the series connectors between electrodes.

Referring to FIGS. 6 and 7, we see a plurality of microwave generators such as 10*a* and 10*b* used in conjunction with a plurality of microwave converter elements (not shown) but which will be positioned in the same fashion as in FIGS. 2 and 4 along the negative electrodes, such as 34*a* and 34*b*, and 34*c*, of the respective MHD generators. It will be noted in the FIGS. 6 and 7 environment that the MHD generators are in toroidal placement so as to utilize the entire magnetic circuit. In the FIG. 6 configuration it will be noted that the plasma or electrically charged fluid flow in the MHD generators is axial while the electrical field is radial. So as to better use the full volume of the magnetized field, half of the MHD generators 10*a*, 10*b*, etc. in the FIG. 7 environment flow in reverse direction. The FIG. 7 environment also permits a shortening of the series connectors between the electrodes.

A more complete description of the amplitron illustrated in FIG. 3 may be found in the September 1957 issue of Proceedings I.R.E. entitled "Description and Operating Characteristics of the Platinotron—A New Microwave Tube Device" and also in the October 1959 issue of Microwave Journal entitled "A 3-Megawatt 15-Kilowatt S-Band Amplitron." A more complete description of traveling wave tubes may be found in volumes 2 and 3, No. 12, of the December-January 1959 issue of Microwave Journal in an article entitled "Present State of the Art in High Power Traveling Wave Tubes." It will be obvious to one skilled in the art that other types of cross-field devices such as the Platinotron described in the September 1957 issue of the Procedures of I.R.E. and the Klystron described in the January 1959 issue of the Procedures of I.R.E. and also in the May 1958 Report No. 503 of Stanford University Microwave Laboratory would be equally applicable.

In operation, the MHD generator 10 requires a relatively high value of magnetic flux density with respect to the voltage produced, whereas any microwave converter 42 utilizing the cross-field principle and electrons for microwave generation, requires a relatively low value of magnetic flux density to voltage. It is therefore a teaching of this invention that it might be advisable to use other ionized particles than electrons in the MHD generator which will have greater mass. Utilizing heavier particles requires a higher ratio of magnetic flux density to voltage for interaction. A microwave conversion device of this type might be more compatible with the high ratio magnetic flux voltage utilized in the MHD generator operation.

It is further suggested that it might be advisable to optimize the higher order electric field spacial components of the periodic structure 48 of the cross-field device 42 so that cross-field interaction can take place at the high magnetic field flux densities available from the MHD device.

It is to be understood that the invention is not limited to the specific embodiment herein illustrated and described but may be used in other ways without departure from its spirit as defined by the following claims.

I claim:

1. In combination, duct means, means to establish a magnetic field across said duct means and adjacent thereto on a first side thereof, a negative electrical electrode attached to said first side of said duct, a positive electrical electrode attached to said duct means, means to pass heated fluid with electrically charged particles therein through said duct means to intercept said magnetic field and generate voltage across said positive and negative electrodes, a cross-field device having an anode and a cathode in a vacuum and located adjacent said one side of said duct means and positioned in said magnetic field, and so that said cathode is heated by the heat from said heated fluid to cause electrons to be emitted therefrom, said anode connected to said positive electrode and said cathode connected to said negative electrode to receive said generated voltage therefrom to establish an electrical field crossed with said magnetic field to act upon said emitted electrons to generate microwave energy.

2. Apparatus according to claim 1 wherein said anode is constructed to be a periodically tuned structure and wherein said emitted electrons in passing through said fields are caused to form a selected electron pattern having a selected velocity and an electromagnetic field associated therewith, in which electromagnetic field of said selected electron pattern excites an alternating electromagnetic field about said periodic structure in passing thereby to establish microwave energy.

3. In combination, first means establishing a magnetic field, a magnetohydrodynamic generator positioned to intercept said magnetic field to generate outputs of electrical voltage and heat, a cross-field device positioned to intercept said magnetic field and responsive to said magnetohydrodynamic generator outputs to produce high frequency microwave energy.

4. In combination, first means establishing a magnetic field, a magnetohydrodynamic generator positioned to intercept said magnetic field to generate outputs of electrical voltage and heat, a magnetron positioned to intercept said magnetic field and responsive to said magnetohydrodynamic generator outputs to produce high frequency microwave energy.

5. In combination, first means establishing a magnetic field, a magnetohydrodynamic generator positioned to intercept said magnetic field to generate outputs of electrical voltage and heat, an amplitron positioned to intercept said magnetic field and responsive to said magnetohydrodynamic generator outputs to produce high frequency microwave energy.

References Cited by the Examiner

UNITED STATES PATENTS

| | | | |
|---|---|---|---|
| 2,468,127 | 4/1949 | Smith | 328—230 X |
| 2,980,819 | 4/1961 | Feaster | 310—4 |
| 3,031,399 | 4/1962 | Warnecke et al. | 313—161 X |
| 3,091,709 | 5/1963 | Rosa | 310—11 |

HERMAN KARL SAALBACH, *Primary Examiner.*

DAVID J. GALVIN, GEORGE N. WESTBY, *Examiners.*

R. DZIURGOT, S. CHATMON, JR., *Assistant Examiners.*